US005503868A

United States Patent [19]
Fallin et al.

[11] Patent Number: 5,503,868
[45] Date of Patent: Apr. 2, 1996

[54] ANIMAL FEED AND METHOD OF PRODUCING ANIMAL FEED

[75] Inventors: John C. Fallin, 15311 Knob Hill Curve, Minnetonka, Minn. 55345; John D. Tracy, Ramsey, Minn.

[73] Assignee: John C. Fallin, Minnetonka, Minn.

[21] Appl. No.: 164,079

[22] Filed: Dec. 8, 1993

[51] Int. Cl.⁶ ........................................................ A23K 1/18
[52] U.S. Cl. .......................... 426/656; 426/614; 426/630; 426/635
[58] Field of Search ..................................... 426/614, 656, 426/657, 807, 805, 623, 630, 635

[56] References Cited

U.S. PATENT DOCUMENTS

| | | | |
|---|---|---|---|
| 3,475,180 | 10/1969 | Jones | 426/614 |
| 3,917,861 | 11/1975 | Viera | 426/454 |
| 3,930,054 | 12/1975 | Liot | 426/614 |
| 4,015,026 | 3/1977 | Burkwall | 426/656 |
| 4,045,585 | 8/1977 | Appleman | 426/657 |
| 4,296,134 | 10/1981 | Boldt | 426/614 |
| 4,307,119 | 12/1981 | Robinson | 426/614 |
| 4,675,236 | 6/1987 | Ohkawara | 426/805 |
| 4,803,085 | 2/1989 | Findley | 426/807 |

OTHER PUBLICATIONS

JP 60047643, Mar. 15, 1985, (Japan), Derwent Abstract Acc. No. 85-102393.

*Primary Examiner*—Michael W. Ball
*Assistant Examiner*—Daniel J. Stemmer
*Attorney, Agent, or Firm*—Janal M. Kalis; Amy J. Hoffman

[57] ABSTRACT

A method of manufacturing animal feed comprising combining liquid egg, a protein source and fat and homogenizing the combination. The combination is then spray dried. An animal feed product produced by the method of combining egg, a protein source and fat and then spray drying the combination.

11 Claims, No Drawings

ANIMAL FEED AND METHOD OF PRODUCING ANIMAL FEED

FIELD OF THE INVENTION

The present invention relates to feed products suitable for consumption by animals. Specifically, the invention relates to a feed product and a method of manufacturing the product which is suitable for ingestion by animals with immature digestive tracts. More specifically, the invention is suitable for ingestion by piglets without causing deleterious effects on the piglets' intestines. The method of manufacture of the invention allows production of an economical animal feed including high quality protein.

BACKGROUND

Manufacturing and purchasing animal feed is largely dependent upon economics. Livestock and pet owners strive to supply their animals with feed which is nutritional, however, oftentimes the most nutritional feed is prohibitively expensive. The animal feed manufacturer strives to produce a feed which provides a desirable nutritional profile for animals and is also affordable for the animal owner.

Young animals, with their immature digestive tracts, are among the most expensive and most difficult animals to feed. A second category of animals which are challenging to feed due to sensitive digestive tracts are exotic animals and immunosuppressed animals. Owners must take great care in choosing the feed for these animals to ensure that they can digest the feed and also to ensure that the feed does not harm the immature or sensitive digestive tract. Avian eggs such as chicken eggs have provided an excellent nutritional source of high quality proteins, fat, vitamins, and minerals for adult and baby animals alike. Egg protein contains high quality protein. By "high quality protein" it is meant protein generally lacking the antinutritional factors commonly found in feeds manufactured from soy beans. Egg protein also contains lysozyme which has been shown to provide protection against gram positive bacteria such as *streptococcus albus* and *micrococcus lysodcilctios*. However, animal feed relying primarily on chicken eggs as a protein source and as the major or only component is quite expensive.

Currently, avian eggs are spray-dried to produce feed which is suitable for pets and mink. Mink ranchers, who are less concerned with costs as compared to hog farmers, choose feed produced from spray-dried egg because factors within eggs enhances the shine in the mink's coats. Spray-dried eggs are also desirable for baby farm animals and particularly suitable for piglets. This suitability is attributed to a lack of antinutritional factors such as protease inhibitors, lectins, goitrogens, saponins, estrogens, cyanogens, phytate, oligosaccharides, and antigenic factors. These antinutritional factors cause atrophy and destruction of the villi of the small intestines. This results in malabsorption of nutrients in the small intestine and produces muscle cramps and diarrhea in animals with immature or sensitive digestive tracts.

The aim of animal feed manufacturers is to produce an economical feed having a high nutritional profile which is readily utilized or digested by the ingesting animal.

SUMMARY

The present invention provides a method of manufacturing animal feed which resembles the nutritional profile of avian eggs, particularly chicken eggs. The invention teaches a method of manufacturing egg-containing feed while still keeping costs to a minimum. The result is an animal feed which is economical and is also suitable for the ingestion of animals with sensitive or immature digestive tracts.

A method of manufacturing animal feed is disclosed. The method involves homogenizing a first stage mixture of liquid egg with a supplemental protein source or a sweetener. The homogenized mixture is optionally strained or otherwise treated to remove any large particulates. A second stage mixture is then prepared by adding fat to the first stage mixture. The second stage mixture is first homogenized and then dried to provide the dried animal feed product.

Due to the increased solids content which is added preferably in dry form to the liquid egg, the feed product has a lower moisture content and is therefore quicker to dry as compared to liquid egg. Moreover, the resulting animal feed has a particularly desirable nutritional profile. The feed product has high quality proteins which generally lack antinutritional factors, making the feed suitable for young, exotic and immunosuppressed animals.

DETAILED DESCRIPTION OF THE INVENTION

For the purposes of this disclosure, egg is defined as any avian egg or any combination of avian eggs. Chicken eggs are preferred for use in the invention. Liquid egg is defined as any unprocessed shell-free egg or alternatively any rehydrated product which resulted from adding moisture to previously dried egg. The liquid egg may or may not contain byproducts from removing cholesterol or fat from the egg. Suitable liquid egg is commercially available from egg breaking plants such as, by way of example only, M.G. Waldbaum Company, a subsidiary of Michael Foods, Inc. of Minneapolis, Minn.

Solids, protein and fat content varies from egg to egg. For this reason, the invention requires determining the protein content, fat and solids content of the liquid egg before proceeding with the manufacture of the invention. Fat, solids, and protein content are determined by procedures commonly known in the art. For the purposes of this invention, egg solids are defined as including fat, protein, and trace amounts of minerals. Preferably, an ether extract is performed to determine the fat content of a given liquid egg sample. The solids content is preferably determined by evaporating the liquid, primarily water, from the egg. A Kjeldahl Digest is preferably performed to determine the protein content.

Liquid egg commonly contains protein, fat and solids in the following ranges: protein: 50.0–52.0%; fat: 29.0–32.0%; and solids: 12.5–14.0%. The invention compensates for variability by altering the amount of fat, protein and solids which are added during the manufacture of the feed product of the invention. Preferably, the invention in its liquid state immediately preceding the drying step comprises about 46% protein, about 35% fat, and about 28% solids. For example, one skilled in the art will recognize that if the fat content in the liquid egg is particularly low, more fat is added to the liquid egg in order to compensate for the low original amount of fat.

Egg is known to oftentimes harbor Salmonella and other microorganisms which may cause gastroenteritis. The liquid egg is optionally pasteurized before the invention is manufactured. Eggs are particularly heat sensitive. If eggs are heated above about 140° F., certain protein constituents such as ovalbumin coagulate. Therefore, pasteurization provides a method of reducing the microbial population in the liquid egg without altering the nutrient qualities of the egg.

A batch process is preferred, although one of ordinary skill will recognize a continuous process is also suitable for the invention. About 30% to about 44% by weight dry supplemental protein source is added to about 33% to about 47% by weight liquid egg for the first stage mix. The first stage mix forms the premix to which other ingredients are added. Alternatively, sweetener is added in place of or in combination with the protein source and is added so that up to about 44% by weight sweetener or sweetener/supplemental protein source combination is added to the liquid egg. The dry supplemental protein source of the invention is acquired from any animal protein products, plant proteins, processed grain byproducts, or fish proteins. Examples of animal supplemental protein source suitable for the invention include but are not limited to egg albumin, blood, blood albumin, feather meal, casein, meat, milk and milk products such as whey. Supplemental plant proteins include but are not limited to proteins and flours such as soy, corn, rice, germ meal, gluten, spent hops, and brewers condensed solubles. Sweeteners suitable for the invention include but are not limited to dextrose, sucrose, fructose, saccharine, aspartame, or lactose. The invention anticipates acquiring the supplemental protein from any combination of the listed sources.

Preferably, a combination of dried soy flour, dried soy protein isolate and whey are combined to provide the protein source. Soy protein isolate, soy flour and whey are mixed with the liquid egg for the first stage mixture for about 5 to about 15 minutes, preferably about 10 minutes in a high shear mixer or until the combination is homogenous. About 3:5:1 parts soy flour to soy protein isolate to whey are combined. About 32% by weight of the soy-whey mixture is added to about 35% to about 42% liquid egg by weight. Preferably about 35.5% soy is added to about 38.8% liquid egg. Toasted soy flour is the preferred type of soy flour for the invention since toasting removes trypsin inhibitor and phytate from the soy flour. Dried soy protein isolate having a moisture content of about 7% is preferred and a suitable material is available from Archer Daniels Midland of Decatur, Ill under the trademark Ardex AF.

The present invention is also defined equally as well on a dry weight basis. As described earlier, the present invention mimics the nutritional profile of eggs. On a dry weight basis the preferred invention has the following ratio. Egg:Soy protein isolate: Fat: Soy Flour: Whey ratio of about 1:.6:.62:.35:.12. The preferred blend is defined on a dry weight percentage basis as having about 35-40% egg, about 20-24% soy protein isolate, about 18-25% fat, about 11-15% soy flour, and about 3-5% whey.

It is hypothesized that the water present in the liquid egg rehydrates the dried protein in the soy flour and soy protein isolate. The dried soy protein is then in substantially its natural state which allows for improved digestion by the animal.

Adding soy as the supplemental protein source will add some antinutritional factors to the animal feed. However, these are diluted since they are relatively insignificant when compared to the entire feed product.

It is preferred that some whey is added to the feed product of the invention. Whey contributes to manufacturing ease because it helps to encapsulate the fat and allows the product to homogenize easier. The encapsulation is due to whey's hydrophobic and hydrophilic properties. As commonly known in the food industry, each protein source has its own micelle characteristics. Plant protein and milk proteins are preferably combined in the invention to create a blend of protein micelles. It is believed that a blend of micelles helps to homogenize the ingredients of the invention. Addition of whey to the invention also helps in attaining a desirable nutritional profile in the final feed product.

For the purposes of this disclosure, a homogenous mixture refers to a mixture having a substantially uniform composition throughout the mixture. Although homogenization is preferably achieved by mixing the liquid egg-protein mixture in a high shear mixer, it is also accomplished by other homogenization methods commonly known in the art such as forcing the mixture through a device having minute openings.

While not intending to be bound by theory, it is believed that in the preferred embodiment soy isolate performs three functions. First, it serves as a protein source; second, it serves as an emulsifier; and third, it serves as an emulsion stabilizer. That is, the soy isolate helps to prevent the mixture from separating into two phases. Although egg is also an emulsifier, an additional emulsifier is particularly important if a batch process is employed.

Throughout the entire process of manufacturing the animal feed of the present invention it is important that the proteins present in the liquid egg do not coagulate. This is important for two reasons. First, if the proteins coagulate they tend to form large particulates which cause problems with later processing. For example, the coagulated protein clogs the spray dryer in the preferred method of drying the invention. Second, coagulation denatures the proteins and changes the configuration of the proteins. It is believed that undenatured proteins are easiest for undeveloped or immunosuppressed animals to assimilate. Therefore, during processing, one must take care not to drastically alter the acidity, the salt content or the temperature of the mixture to name a few denaturing agents. Since ovalbumin coagulates at about 140° F. or above, the temperature of the mixture during processing is maintained below about 140° F and preferably at below about 135° F.

It is not critical to maintain the temperature during processing above a minimum other than to ensure that the ingredients do not freeze. Freezing inhibits sufficient combination of the ingredients.

The temperature of the mixture is preferably maintained at about 100° F. to about 140° F. throughout processing by passing the mixture through a tube heater or a heat exchanger. This heats the mixture without applying direct heat and allows continuous flow of the mixture. Maintaining the ingredients in the stated temperature range facilitates mixing.

After the first stage mixing, the mixture is optionally filtered to remove impurities and obstructive particulates which could potentially clog machinery in later processing stages. Although any method of filtering is suitable for the invention, the mixture is preferably passed through about a 100 mesh screen to remove particulates.

During the second stage, fat is added to the first stage mixture. Fat is preferably heated to between about 105° F. to about 125° F. to ensure that the fat is in a liquid state. Although liquid fat facilitates mixing, solid fat could also be used, however, this would require increased mixing to sufficiently dissipate lumps of fat. Any fat is suitable for the present invention including but not limited to cotton seed oil, peanut oil, corn oil, or lard. Preferably, edible lard or choice white grease is heated to a temperature of about 110° F. to about 120° F. and about 20% to about 26% by weight fat is added to about 74% to about 80% of the first stage mixture by weight. The entire mixture is now referred to as the second stage mixture. The second stage mixture is homogenized preferably by pumping the mixture through an in-line homogenizer, however, as described above, any method of homogenization is suitable.

After homogenization, the second stage mixture is agitated to ensure that phases of the mixture do not separate. Any agitation method is suitable for the invention. The present invention preferably employs a standard agitator which rotates at between about 30 and about 120 rpms. If the process employs a continuous process, separate agitation is probably not necessary to maintain the mixture in a single phase since the process alone provides sufficient agitation.

After the second stage addition, all ingredients are now included and the mixture now comprises about 42% to about 48% protein, about 32% to about 37% fat, and about 26% to about 30% solids. This is different than the fat, solids, and protein profile which originally existed in the liquid egg.

The second stage mixture is next dried. Drying the product accomplishes a couple of desirable factors. It reduces moisture content which reduces weight and thereby reduces shipping costs. The moisture reduction also limits microbial growth which reduces spoilage of the feed. This is particularly important since one of the main components of the feed is egg which oftentimes is contaminated with Salmonella.

Any method of drying the mixture is suitable for the present invention provided the drying method does not excessively heat the product. It is hypothesized that gentler drying treatments cause the proteins present in the feed to dry in a substantially natural state or allow the molecular structure of the components to remain substantially intact. This allows the animal to more easily assimilate the protein. It is also hypothesized that the reduced temperature helps maintain the activity of the lysozyme. Suitable drying methods are methods which employ gentle evaporation which include but are not limited to spray drying, atomizing, and box drying. Atomizers and spray driers are preferred methods of drying because the internal temperature of the product remains relatively cool yet the drying is accomplished in a relatively short amount of time.

The product is preferably spray dried by pumping the mixture through a high-pressure pump at about 2,500 to about 4,000 pounds pressure into a box dryer. A particle size which will pass through about a 200 to about a 400 mesh screen is preferable for the dried product. About 95% of the dried product passes through a 300 mesh screen. In order to achieve this particle size a Delevan number 70 spray orifice is preferably used. The spray dried product has a moisture content in the range of greater than about 0.1% up to about 7%. After drying, the product is pneumatically cooled until the product reaches about ambient temperature.

Without intending to be bound by theory, the increase in solids content is believed to contribute in part to the success of the present invention. The increased solids content causes a reduction in the moisture content of the mixture. Reducing the moisture content as compared to the moisture found naturally occurring in liquid eggs causes the animal feed mixture to dry much quicker than liquid eggs. This reduction in drying time reduces production costs as compared to drying liquid egg. The reduction in drying time ranges from between about 10% to about 200% reduction depending upon the environmental conditions at the time of drying. That is, if the environment is particularly dry as in the desert, one can reduce drying time by about 200%. However, if the ambient air is particularly humid, drying time is not reduced so drastically.

The product of the present invention provides an animal feed with an amino acid nutrient profile suitable for lean tissue. It is also hypothesized that the fatty acid profile of the feed will promote improved immune response in the ingesting animals.

The method of preparing the present invention is not order-dependent. The animal feed of the present invention is preferably prepared by first combining the first stage ingredients and next adding the second stage ingredients, however, other orders of adding ingredients also work. For example, the same feed product will result if fat is added to liquid egg for the first stage and then the supplemental protein source and/or sweetener is added for the second stage mixture. Likewise, about 30–44% by weight supplemental protein source, about 33–47% by weight liquid egg and about 19–27% by weight fat may all be added together for a one-stage mixing process. The only disadvantage is that such a one-stage procedure may require increased mixing to achieve a substantially homogenous mixture. One skilled in the art will recognize that a product having the same nutrient profile and the same reduced drying time will result if the ingredients are added in reverse order or if the ingredients are added simultaneously. However, ease of handling is observed in the preferred order.

Alternatively, one could add only a protein source or only fat to liquid egg and then dry this mixture to create an animal feed. Such an animal feed would not have as desirable of a nutritional profile as an animal feed containing liquid egg, a supplemental protein source and fat. However, addition of only fat or only a supplemental protein source to liquid egg would increase the solids content as compared to that commonly found in liquid egg to cause decreased drying time. Such a product is likewise suitable for feeding to animals but may require additional or complementary feeds as a supplement.

one skilled in the art will recognize that details of the previous embodiment may be varied without departing from the spirit and scope of the invention.

We claim:

1. A method for manufacturing feed for young animals with immature digestive tracts comprising the steps of:

combining egg, a protein that includes a soy protein isolate, and fat in a ratio of about 1.7:1.6:1 by weight; and homogenizing said combination to make an egg-based animal feed for young animals with immature digestive tracts.

2. The method of claim 1 further comprising drying said homogenized combination.

3. The method of claim 2 wherein said drying is achieved by spray drying.

4. The method of claim 1 wherein said egg, protein source, and fat are added in ratios to achieve an animal feed having between about 42% to about 48% protein by weight, about 32% to about 37% fat by weight, and about to about 30% solids by weight before drying.

5. The method of claim 1 further comprising adding a sweetener to said animal feed.

6. A feed product for young animals with immature digestive tracts produced by the method of claim 1.

7. A method of preparing feed for a young animal with an immature digestive tract, comprising the steps of:

adding about 14% to about 20% by weight dried soy flour and about 16% to about 24% by weight dried soy protein isolate to about 33% to about 47% by weight egg, to prepare a first stage mixture;

homogenizing said first stage mixture while maintaining said mixture at below about 140 degrees Fahrenheit;

combining about 19–27% by weight fat with said first stage mixture to prepare a second stage mixture while maintaining said second stage mixture at below about 140 degrees Fahrenheit; and drying said second stage mixture.

8. The method of claim 7 further comprising homogenizing said second stage mixture before drying.

9. The method of claim 7 wherein said drying step includes spray drying said second stage mixture.

10. The method of claim 7 wherein said fat is in a liquid state when combined with said first stage mixture.

11. A feed for a young animal with an immature digestive tract, comprising: about 35% to about 45% egg, about 20% to about 24% soy protein isolate, about 18% to about 22% fat, about 11% to about 15% soy flour, and about 3% to about 5% whey on a dry weight basis.

* * * * *